UNITED STATES PATENT OFFICE.

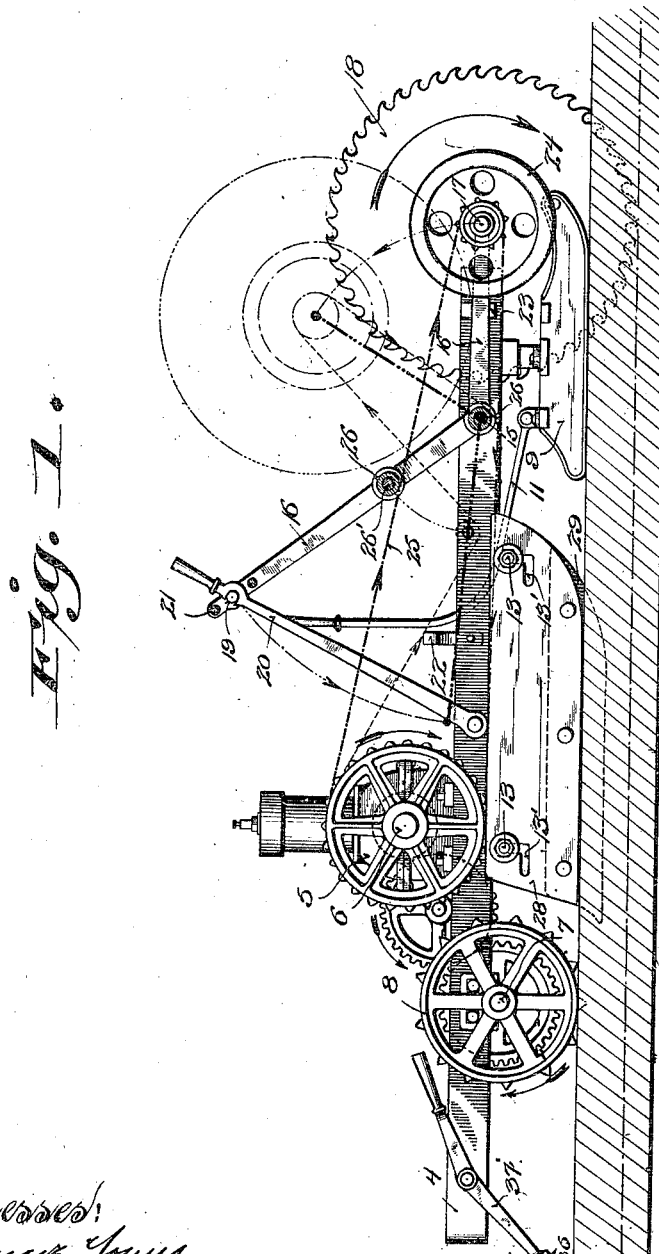

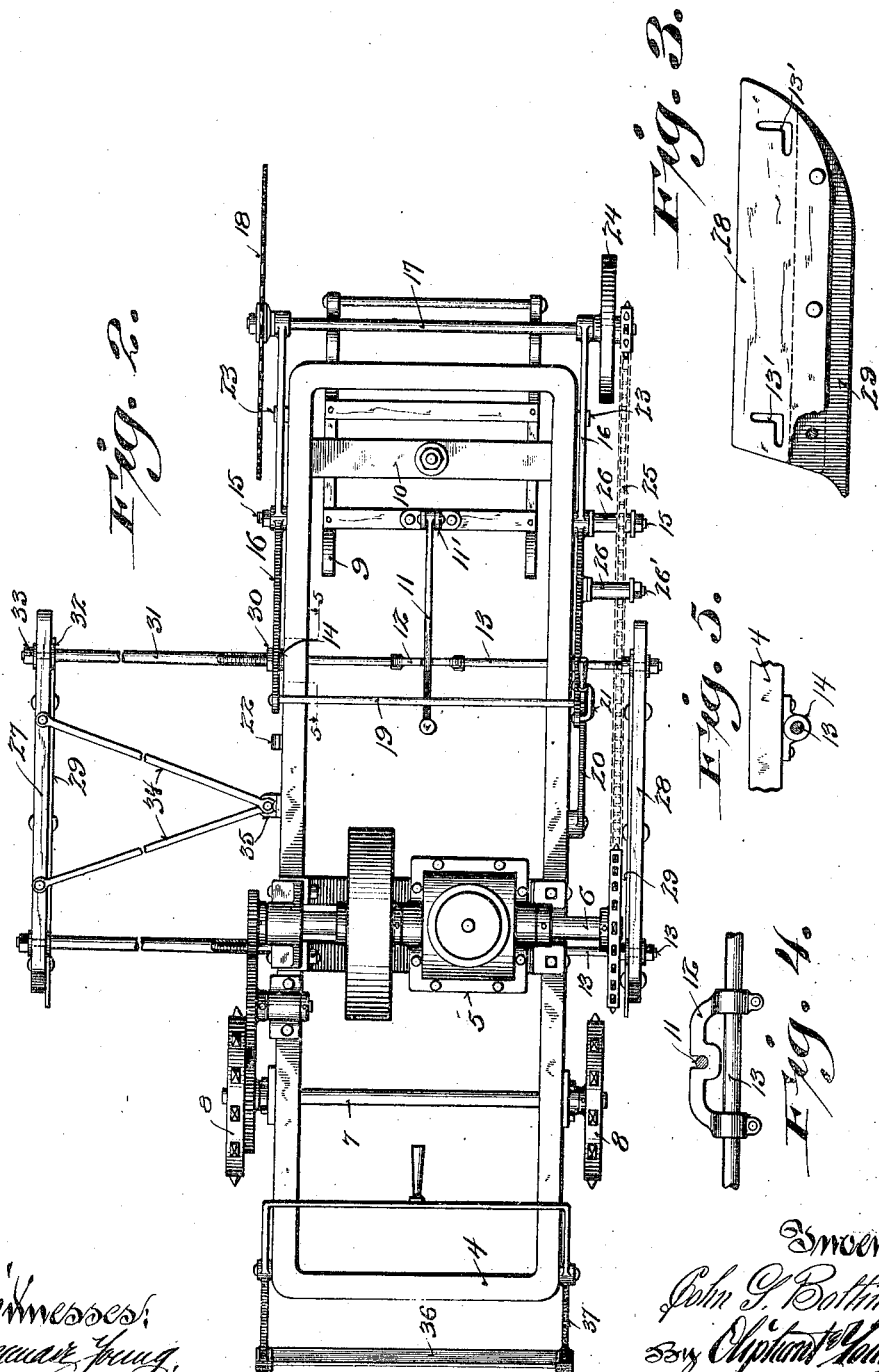

JOHN G. BOLTING, OF TOWN OF SUMMIT, WAUKESHA COUNTY, WISCONSIN.

ICE-CUTTING MACHINE.

998,598. Specification of Letters Patent. Patented July 25, 1911.

Application filed May 9, 1911. Serial No. 625,997.

*To all whom it may concern:*

Be it known that I, JOHN G. BOLTING, a citizen of the United States, and resident of the town of Summit, in the county of Waukesha and State of Wisconsin, have invented certain new and useful Improvements in Ice-Cutting Machines; and I do hereby declare that the following is a full, clear, and exact description thereof.

My invention consists in what is herein particularly set forth with reference to the accompanying drawings and pointed out in the claims of this specification, its object being to provide simple, economical and efficient self-propelled machines for cutting ice upon lakes and streams.

Figure 1 of the drawings represents a partly sectional side elevation of an ice-cutting machine made in accordance with my invention; Fig. 2, a plan view of the same; Fig. 3, a side elevation of a guide-runner of the machine partly broken away; Fig. 4, a front elevation of a detail of the machine, and Fig. 5, a side elevation of another detail of said machine.

Referring by numerals to the drawings, 4 indicates a rectangular main frame of any suitable material and construction. Mounted in connection with said frame is a motor, the one 5 herein shown being of the internal-combustion type with which gasolene is used for fuel. One end of the motor shaft 6 is in gear-train connection with a rear axle 7 for which said frame is provided with bearings, and traction-wheels 8 are fast on the axle to turn therewith.

A sled 9 is pivotally connected to a forward cross-piece 10 of the frame 4, and a steering-handle 11 pivoted to a bracket 11' at the rear end of the sled central of the same is normally caught in a locking bracket 12 fast on one of a pair of parallel rods 13 for which hangers 14 are provided in connection with the sides of said frame, the sled being then set to run straight ahead. The sides of the main frame 4 are also provided with pivot studs or bolts 15 for bellcrank sides 16 of another frame having bearings for the arbor 17 of a circular saw 18, and an upper cross-rod 19 of the pivotal saw frame is normally caught at one end in a notch of a latching lever 20 that is pivotally connected to one side of said main frame. When disconnected from the rod 19, the latching lever 20 has play in a side bail 21 of the saw-carrying frame, and the main-frame is provided with a snap-latch 22 or other suitable device by which to hold the other frame in the position to which it is swung away from stops 23 on said main frame to elevate the saw from normal position to that shown by dotted lines in Fig. 1. A fly-wheel 24 is provided on the saw-arbor, and the motor shaft 6 is in link-belt and sprocket-gear connection with said arbor, the upper and lower stretches of the belt 25 being run under a pair of antifriction rollers 26 respectively arranged on a lateral stud 26' of the saw-carrying frame and one of the pivots 15 therefor, these rollers in the arrangement specified serving to prevent slacking of said belt when the saw is swung up out of working position.

The rods 13 are for engagement with right-angle slots 13' in runners 27 and 28, and each of these runners is provided with a depending blade 29 for engagement with a saw-kerf in the ice upon which the machine operates. The runner 27 is first held on the rods 13 between stops 30 and nuts for which the adjacent ends of said rods are screw-threaded, in order that the blade 29 of said runner may track in the first of a series of parallel kerfs cut in the ice, but after the cut of the second of said kerfs said runner is secured on sleeve-extensions 31 of said rods between stops 32 and nuts 33 for which the outer ends of said extensions are threaded, these nuts having been previously employed on the aforesaid rods. When the runner is arranged on the sleeve-extensions 31 of the rods 13, braces 34 are employed to connect said runner with a side bracket 35 of the main frame. The other runner 28 is permanently arranged on the rods 13 at a predetermined distance from the main frame.

A scraper 36 has a cranked bail 37 thereof in pivotal connection with the sides of the main frame at the rear thereof, and it may be employed as a lever to aid in lifting the rear end of the machine to facilitate engagement of a runner-blade 29 with a saw-kerf in the ice.

In practice, after making the first of a series of parallel kerfs in the ice, the machine is turned around and set to have the blade of the runner 28 engage said kerf and thus guide the machine in the making of the second kerf, then upon again turning the machine, the runner 27 is set out, as shown in Fig. 2, to have its blade run in the second kerf to guide the machine in making the third kerf, the distance between the saw line and each runner blade being then equal, so that thereafter the blade of one or the other of the guide-runners engages the last completed kerf. On the completion of a kerf the guide-runner in the previously completed kerf is lifted to bring its blade out of the same, and it may be moved forward to have the horizontal portions of its slots rest upon its supports and hence remain in its elevated position while idle as a guide.

Previous to turning the machine, the saw is elevated by a swing of its frame to the position shown by dotted lines in Fig. 1, where it is held for the time being, as a result of an engagement of a side of said frame with the latch 22 or some other convenient securing device, and said machine may be provided with a suitably arranged seat for its operator.

I claim:

1. An ice-cutting machine comprising a main-frame, a forward frame-supporting pivotal sled and means for securing the same in straight ahead position, a rear axle hung in connection with said frame, traction-wheels fast on the axle, a frame-supported motor in gear-train connection with said axle, another frame in pivotally adjustable connection with the main-frame and carrying an arbor to which a circular saw and fly-wheel for the same are attached, stops limiting swing of the saw-carrying frame in one direction, means for holding said saw-carrying frame in adjusted position, link-belt and sprocket-wheel gearing connecting the motor shaft and saw-arbor, means for preventing slack of the belt incidental to adjustments of the saw-carrying frame, and vertically adjustable side runners each having a depending blade for engagement with a saw-kerf in the ice.

2. An ice-cutting machine comprising a main-frame, a forward frame-supporting pivotal sled and means for securing the same in straight ahead position, a rear axle hung in connection with said frame, traction-wheels fast on the axle, a frame-supported motor in gear-train connection with said axle, another frame in pivotally adjustable connection with the main-frame and carrying an arbor to which a circular saw and fly-wheel for the same are attached, stops limiting swing of the saw-carrying frame in one direction, means for holding said saw-carrying frame in adjusted position, link-belt and sprocket-wheel gearing connecting the motor shaft and saw-arbor, means for preventing slack of the belt incidental to adjustments of the saw-carrying frame, vertically adjustable side runners each having a depending blade for engagement with a saw-kerf in the ice, and means for extending the supports for one of the runners laterally from said main frame.

3. An ice-cutting machine comprising a main-frame, a forward frame-supporting pivotal sled and means for securing the same in straight ahead position, a rear axle hung in connection with said frame, traction-wheels fast on the axle, a frame-supported motor in gear-train connection with said axle, another frame in pivotally adjustable connection with the main-frame and carrying an arbor to which a circular saw and fly-wheel for the same are attached, stops limiting swing of the saw-carrying frame in one direction, means for holding said saw-carrying frame in adjusted position, link-belt and sprocket-wheel gearing connecting the motor shaft and saw-arbor, means for preventing slack of the belt incidental to adjustments of the saw-carrying frame, vertically adjustable side runners each having a depending blade for engagement with a saw-kerf in the ice, and a scraper pivotally hung in connection with said main frame.

4. An ice-cutting machine comprising a main-frame, a forward frame-supporting pivotal sled and means for securing the same in straight ahead position, a rear axle hung in connection with said frame, traction-wheels fast on the axle, a frame-supported motor in gear-train connection with said axle, another frame in pivotally adjustable connection with the main-frame and carrying an arbor to which a circular saw and fly-wheel for the same are attached, stops limiting swing of the saw-carrying frame in one direction, means for holding said saw-carrying frame in adjusted position, link-belt and sprocket-wheel gearing connecting the motor shaft and saw-arbor, means for preventing slack of the belt incidental to adjustments of the saw-carrying frame, vertically adjustable side runners each having a depending blade for engagement with a saw-kerf in the ice, means for extending the supports for one of the runners laterally from the main frame, and a scraper pivotally hung in connection with said main frame.

5. An ice-cutting machine comprising a main-frame, a forward frame-supporting pivotal sled and means for securing the same in straight ahead position, a rear axle hung in connection with said frame, traction-wheels fast on the axle, a frame-supported motor in gear-train connection with said axle, another frame in pivotally adjustable connection with the main-frame and carrying an arbor to which a circular saw and fly-wheel for the same are attached, stops limiting swing of the saw-carrying frame in one direction, a latching-lever engaging a side-bail provided in connection with said saw-carrying frame, means for holding the same frame in position to elevate the saw, link-belt and sprocket-wheel gearing connecting the motor shaft and saw-arbor, means for preventing slack of the belt incidental to adjustments of the saw-carrying frame, and vertically adjustable side-runners, each having a depending blade for engagement with a saw-kerf in the ice.

6. An ice-cutting machine comprising a main-frame, a forward frame-supporting pivotal sled and means for securing the same in straight ahead position, a rear axle hung in connection with said frame, traction-wheels fast on the axle, a frame-supported motor in gear-train connection with said axle, another frame in pivotally adjustable connection with the main-frame and carrying an arbor to which a circular saw and fly-wheel for the same are attached, stops limiting swing of the saw-carrying frame in one direction, means for holding said saw-carrying frame in adjusted position, link-belt and sprocket-wheel gearing connecting the motor shaft and saw-arbor, means for preventing slack of the belt incidental to adjustments of the saw-carrying frame, side runners provided with right-angle slots engaged by supports with which the main frame is provided, and a blade depending from each of said runners to engage a saw-kerf in the ice.

In testimony that I claim the foregoing I have hereunto set my hand at the city of Oconomowoc, in the county of Waukesha and State of Wisconsin in the presence of two witnesses.

JOHN G. BOLTING.

Witnesses:
GEORGE A. DIBBLE,
HENRY L. BENTE.

---

Copies of this patent may be obtained for five cents each, by addressing the "Commissioner of Patents, Washington, D. C."